Jan. 4, 1927.
H. M. ROSENDAL DAM
DRY BATTERY
Original Filed August 14, 1923
1,613,586
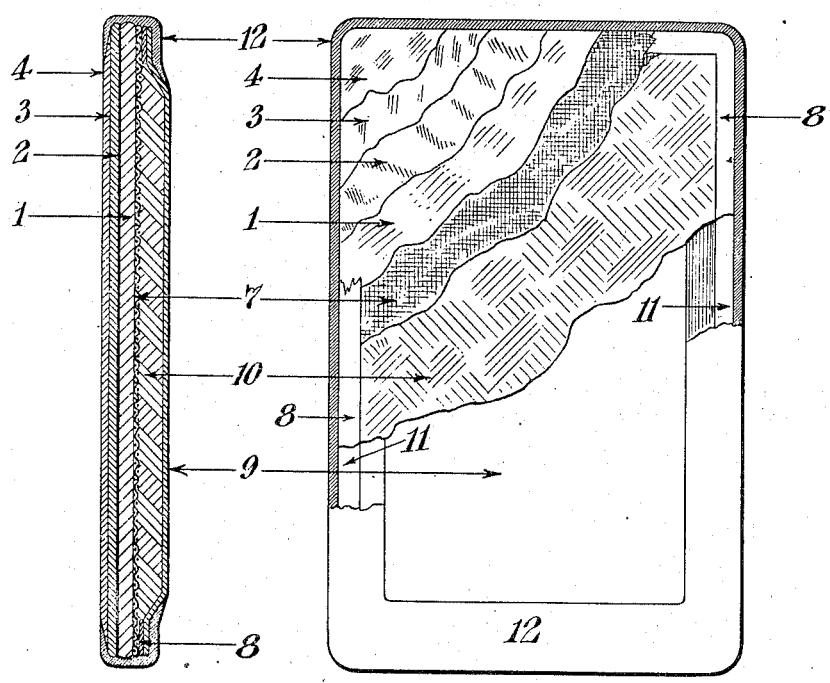
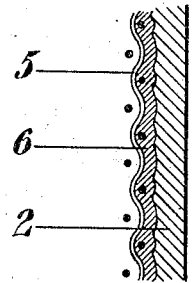
Inventor
Henry M. Rosendal Dam
By his Attorneys
Ward Crosby & Smith Patented Jan. 4, 1927.

1,613,586

UNITED STATES PATENT OFFICE.

HENRY M. ROSENDAL DAM, OF ASTORIA, NEW YORK, ASSIGNOR TO HEINRICH GATTIKER-TANNER, OF RAPPERSWIL, ST. GALL, SWITZERLAND.

DRY BATTERY.

Original application filed August 14, 1923, Serial No. 657,288. Divided and this application filed December 2, 1924, Serial No. 753,421. Renewed November 2, 1926.

This invention relates to dry batteries of the kind in which each unit is in the form of a plate, and each plate being composed of electrodes in plate form between which an electrolyte is confined.

The general object of the invention is to provide a more efficient plate battery than is obtainable by following the prior art. It is also an object of the invention to provide an improved method for making such unit plates whereby greater efficiency electrically as well as many advantages in the manufacture itself may be obtained.

My invention, therefore, is embodied in a dry battery unit and method for making the same as hereinafter set forth and as illustrated in the accompanying drawing in which—

Fig. 1 is a sectional view of a plate unit embodying my invention;

Fig. 2 is a face view of said plate unit with parts broken away; and

Fig. 3 is a detail view illustrating a modification.

In making the plate unit 1 which in itself constitutes a battery, the following method or process is carried out.

As a first step a depolarizing mixture is prepared in powder form, said mixture consisting of manganese, graphite and salammoniac in varying proportions depending upon the service to be obtained from the battery. The mixture is moistened with water or a suitable binder and compressed into plate form in a mold.

The plate remains in the mold and on top of it there is placed a layer of graphite, pulverized, which has been impregnated with an impregnating material, such for instance as melted rosin, bees wax, ceresin or like substances. The graphite layer is then compressed on top of the depolarizing mixture plate.

The graphite is saturated with the impregnating material aforesaid to such an extent that it will form a plate when compressed, which shall be both impervious and conductive to an extent to permit the maximum current, also known as a short circuit current, to pass through the plate.

The plate is then removed from the mold and placed in an oven on which the binder is baked to make the graphite absolutely impervious. The plate is then cooled, and constitutes the positive or carbon electrode of the battery.

The result is a plate of which one side is composed of the depolarizing mixture while the other side is in the form of a definite distinct graphite plate.

In the drawing the two elements described are marked respectively 1 for the depolarizing mixture plate and 2 for the graphite plate.

Thereafter a conducting coating is applied to the graphite plate. This may be done galvano plastically and the plate coated with copper. This, however, is a process which requires extreme care, complicated apparatus and cannot always be carried out successfully. I have found that excellent results are obtained by applying a thin coat of a suitable binder 3 to the graphite and then press a sheet of conducting metal foil 4 onto the plate. The binder being very thin, it is illustrated in the drawing by a heavy line 3. The foil may be of usual commercial thickness. As stated the foil is applied under pressure, for instance by again placing the plate in the mold, in order to obtain intimate contact between the graphite and the foil.

As a modification, I may use metal screen wire 5, see Fig. 3, for pressing the foil 6 into intimate contact with the graphite. It gives excellent results.

The edges of the plate are then bound with paraffin to make it impervious.

Thereafter a piece of fabric 7 is laid on the depolarizing mixture plate and a paper frame 8 is placed over the edges of the cloth.

In order to cause the depolarizing mixture to respond to electrochemical action it must be moistened. A solution of salammoniac and zinc chloride produces the desired effect. The solution is conveniently applied to the fabric from which the solution then soaks into the depolarizing mixture plate.

The negative element of the battery is in the form of a dished plate of zinc 9 which is filled with an electrolyte 10 in paste form and composed of salammoniac, zinc chloride and bichloride of mercury, or other suitable solution to which an organic substance such for instance as corn starch, has been added to form a paste. It will be noted that the zinc electrode serves as a convenient means mechanically for containing and applying the electrolyte. The flanges 11 of the zinc element fit snugly against the separator element 8, that is the paper frame. The electrolytic paste also serves as a binding means between the fabric 7 and the zinc.

Thereafter the plate is finally sealed up by an edging 12 of paraffin, wax or the like, which of course merges with the previous applications of like substances, hence the sealing member is designated as one element 12.

It will be clear from the foregoing description and the drawing, that a novel, greatly improved and highly efficient dry battery plate has been provided in accordance with the invention, and also that a novel process or method of manufacture has been devised in order to obtain quantity production and greater electrical capacity and efficiency.

The invention distinguishes over the prior art in providing a distinct separate graphite plate baked to a hardness resulting in greater density, producing greater capacity per unit of volume and weight. The fabric serves as a separating means preventing disintegration of the depolarizing mixture.

The finished plate is of course a battery in itself. As many plates as may be required for a given output may be assembled, one plate alongside of the other, with the opposed elements in contact and contained in a convenient box. If any one plate unit becomes defective, it may be quickly and easily removed and a new one inserted. Tapping the battery for different voltages is also an easy matter. The absence, obviously so, of soldered or mechanical connections between cells is also a marked advantage. This is especially noteworthy when the battery is used in connection with radio apparatus.

This application is in the nature of a division of my co-pending application Serial Number 657,288, filed August 14, 1923, for dry batteries.

Having thus described my invention with particularity with reference to the preferred method of carrying out the same and having referred to some of the possible modifications thereof, it will be obvious to those skilled in the art, after understanding my invention, that other changes and modifications may be made therein without departing from the spirit and scope of my invention, and I aim in the appended claims to cover such changes and modifications as are within the scope of the invention.

Having thus described my invention, what I claim as new and desire to secure by Letters Patent, is:

1. The method of making carbon electrodes of the character specified, which consists in first compressing a depolarizing mixture into plate form, then compressing a layer of impregnated graphite on top of said compressed plate of depolarizing mixture and thereafter baking and cooling the compressed plate.

2. The method of making carbon electrodes of the character specified, which consists in first compressing a depolarizing mixture into plate form, then compressing a layer of impregnated graphite on top of said compressed plate of depolarizing mixture, then baking and cooling the compressed plate and thereafter attaching a metallic coating to the said graphite layer.

3. The method of making a positive element for a galvanic battery which consists in first compressing a depolarizing mixture into plate form, then compressing a layer of impregnated graphite on top of said compressed plate of depolarizing mixture and thereafter coating the one side of said positive element with a conducting element.

In testimony whereof I have signed my name to this specification.

HENRY M. ROSENDAL DAM.